United States Patent
Okamoto et al.

[11] Patent Number: 6,092,431
[45] Date of Patent: Jul. 25, 2000

[54] ROTARY TYPE DRIVING DEVICE EMPLOYING ELECTROMECHANICAL TRANSDUCER AND APPARATUS PROVIDED WITH THE ROTARY TYPE DRIVING DEVICE

[75] Inventors: Yasuhiro Okamoto, Tondabayashi; Yasushi Tanijiri, Sakai, both of Japan

[73] Assignee: Minolta Co., Ltd., Osaka, Japan

[21] Appl. No.: 08/923,111

[22] Filed: Sep. 4, 1997

[30] Foreign Application Priority Data

Sep. 5, 1996 [JP] Japan ................................. 8-253956

[51] Int. Cl.[7] ........................... F16H 27/02; H01L 41/04; G02B 7/02
[52] U.S. Cl. ........................... 74/128; 310/328; 310/323; 359/824; 359/823; 396/461
[58] Field of Search ..................... 74/128, 99 R; 476/67; 310/328, 323; 396/133, 248, 261, 467, 468; 428/147; 359/824, 823

[56] References Cited

U.S. PATENT DOCUMENTS

| | | | |
|---|---|---|---|
| 2,596,226 | 5/1952 | Eldridge, Jr. | 74/128 X |
| 3,015,956 | 1/1962 | Eklund | 396/461 X |
| 3,889,283 | 6/1975 | Rossmann | 396/461 X |
| 4,024,553 | 5/1977 | Maitani et al. | 396/468 X |
| 4,264,154 | 4/1981 | Petersen | 396/468 X |
| 4,468,583 | 8/1984 | Mori . | |
| 4,956,211 | 9/1990 | Saito | 428/147 |
| 5,225,941 | 7/1993 | Saito et al. . | |
| 5,410,206 | 4/1995 | Luecke et al. . | |
| 5,589,723 | 12/1996 | Yoshida et al. . | |
| 5,696,421 | 12/1997 | Zumeris et al. | 310/328 |

FOREIGN PATENT DOCUMENTS 6-261559  9/1994  Japan .

*Primary Examiner*—Tamara L. Graysay
*Assistant Examiner*—Marcus Charles
*Attorney, Agent, or Firm*—Burns, Doane, Swecker & Mathis, LLP

[57] ABSTRACT

A driving device (actuator) 10 includes a driving shaft 16 which is Linearly driven in the axial direction by a piezoelectric element 15 and two disks 18a and 18b which are made of an elastic material and fixed to a rotary shaft 17. Peripheral portions of the two disks 18a and 18b vertically hold the driving shaft 16 between them so as to be frictionally coupled with the driving shaft 16 by their elastic forces. When the driving shaft 16 is linearly driven in the axial direction by the piezoelectric element 15, the peripheral portions of the two disks 18a and 18b receive a force in the tangential direction and rotate around the rotary shaft 17.

32 Claims, 9 Drawing Sheets

(a)

(b)

ROTARY TYPE DRIVING DEVICE EMPLOYING ELECTROMECHANICAL TRANSDUCER AND APPARATUS PROVIDED WITH THE ROTARY TYPE DRIVING DEVICE

BACKGROUND OF THE INVENTION

1. Field of the Invention

The present invention relates to a rotary type driving device employing an electromechanical transducer or an appratus provided with such a device.

2. Description of the Prior Art

Electromagnetic motors have been widely used as a rotary type driving device, and lately a compact, high-speed rotary type has been widely used. On the other hand, a variety of apparatuses employing this kind of driving device are required to achieve accurate position control and high resolution, i.e., accurate control of the angle of rotation, and therefore, the apparatuses have been conventionally provided by combining an electromagnetic motor with a reduction mechanism.

However, when using the reduction mechanism, each apparatus increases in size, and it has been difficult, in practicality, to accurately control the angle of rotation due to the backlash of the gears constituting the reduction mechanism and the like.

In order to solve this problem, the applicant has proposed a linearly advancing type driving device employing an electromechanical transducer as shown in FIGS. 13 and 14 as a driving device which is compact and able to achieve position control with high resolution, i.e., accurately. Further, for the purpose of improving its versatility, the applicant has proposed a rotary type driving device employing an electromechanical transducer as shown in FIGS. 15 and 16 (refer to Japanese Laid-open Patent Publication No. HEI 6-261559). The driving device employing such an electromechanical transducer is constructed so that an extension/contraction displacement is generated in the electromechanical transducer, the extension/contraction displacement is transmitted to a driving member and a driven member is moved via a moving member frictionally coupled with the driving member.

Describing this construction in brief, FIGS. 13 and 14 show an example of the linearly advancing type driving device, where FIG. 13 is a perspective view showing a disassembled state, and FIG. 14 is a perspective view showing an assembled state. The linearly advancing type driving device 100 is constructed of a frame 101, support blocks 103 and 104 on the frame 101, a driving shaft 106, a piezoelectric element 105, a slider 102 and so forth. The driving shaft 106 is supported movably in the axial direction by a support block 103a and the support block 104. One end of the piezoelectric element 105 is fixed by bonding to the support block 103, and the other end is fixed by bonding to one end of the driving shaft 106. The driving shaft 106 is supported displaceably in the axial direction (in the direction of arrow "a" and in the direction opposite to it) when a displacement is generated in the direction of thickness of the piezoelectric element 105.

The driving shaft 106 penetrates the slider 102 in the transverse direction, and an opening 102a is formed in an upper portion where the driving shaft 106 penetrates, so that the upper half portion of the driving shaft 106 is exposed. Further, a pad 108 which abuts against the upper half portion of the driving shaft 106 is fitted into this opening 102a, and the pad 108 has its upper portion provided with a projection 108a, where the projection 108a of the pad 108 is depressed by a leaf spring 109, so that a downward urging force F is applied to the pad 108 which abuts against the driving shaft 106.

With the above arrangement, the slider 102 including the pad 108 and the driving shaft 106 are put in pressure contact with each other by the downward urging force F of the leaf spring 109, thereby achieving a frictional coupling.

The operation will be described next. First, a saw-tooth wave drive pulse having a gradual rising portion and a steep falling portion as shown in (a) of FIG. 17 is applied to the piezoelectric element 105, the piezoelectric element 105 is displaced as gradually extended in the direction of thickness in the gradual rising portion of the drive pulse, and the driving shaft 106 coupled with the piezoelectric element 105 is also gradually displaced in the positive direction (in the direction of arrow "a"). In this stage, the slider 102 frictionally coupled with the driving shaft 106 moves in the positive direction together with the driving shaft 106 by a frictional coupling force.

In the steep falling portion of the drive pulse, the piezoelectric element 105 is displaced as it is rapidly contracted in the direction of thickness, and the driving shaft 106 coupled with the piezoelectric element 105 is also rapidly displaced in the negative direction (the direction opposite to the direction of arrow "a"). In this stage, the slider 102 frictionally coupled with the driving shaft 106 substantially stays in the position as a consequence of the inertia force conquest over the frictional coupling force. By continuously applying the aforementioned drive pulse to the piezoelectric element 105, the slider 102 can be moved continuously in the positive direction.

For the movement of the slider 102 in the direction opposite to the aforementioned direction (in the direction opposite to the direction of arrow "a"), the movement can be achieved by changing the waveform of the saw-tooth wave drive pulse applied to the piezoelectric element 105 and applying a drive pulse having a steep rising portion and a gradual falling portion as shown in (b) of FIG. 17.

FIGS. 15 and 16 show an example of the rotary type driving device, where FIG. 15 is a perspective view of it, and FIG. 16 is a sectional view of it. Around a shaft 202 provided on a fixing member 201 are arranged a thrust bearing 204, a driving member 205, a friction disk 206, a rotor 207, a thrust bearing 208 and a spring 209 in this order. A piezoelectric element 215 is placed between a surface 201b of a receiving portion 201a of the fixing member 201 and a surface 205b of a cutaway portion 205a of the driving member 205 and it is fixed by bonding to the surfaces. By adjusting the tightening amount of a nut 210 meshed with a threaded portion 211 of the shaft 202, a frictional coupling force among the driving member 205, the friction disk 206 and the rotor 207 is adjusted.

When a saw-tooth wave drive pulse is applied to the piezoelectric element 215, the rotor 207 rotates via the driving member 205 and the friction disk 206 with respect to the fixing member 201 in the case of a gradual extension displacement of the piezoelectric element 215 similar to the case of the linearly advancing type driving device set forth. In the case of a rapid contraction displacement of the piezoelectric element 215, the driving member 205 rotates in the reverse direction, whereas the rotor 207 stays in the position. By continuously applying a drive pulse, the rotor 207 can be rotated in a specified direction.

The driving device employing the aforementioned electromechanical transducer, the driving member of which has a relatively large size, and is therefore required to be further reduced in weight. Furthermore, it is required to use a frequency higher than the audio frequency that can be heard by the human ear as the drive frequency of the electromechanical transducing element for the prevention of an unpleasant sensation to the human ear. However, for the purpose of efficiently driving the electromechanical transducer at such a high frequency, a further device has been required.

SUMMARY OF THE INVENTION

It is an object of the present invention to obtain a further compacted rotary type driving device.

Another object of the present invention is to obtain an apparatus provided with such a rotary type driving device.

A further object of the present invention is to obtain a rotary type driving device capable of being driven at higher speed in a range exceeding the audio frequency range.

Another object of the present invention is to obtain an apparatus provided with such a rotary type driving device.

For giving solution to the aforementioned problems, one aspect of the present invention comprises: a base; an electromechanical transducer which has its one end in the extension/contraction direction fixed to said base; a driving member which is connected to the other end in the extension/contraction direction of said electromechanical transducer and linearly movably supported in the extension/contraction direction of said electromechanical transducer; and a rotating portion which is in contact with said driving member and rotated by the extension/contraction of said electromechanical transducer.

Then, said rotating portion is comprised of at least two members, and the members can be made to abut against said driving member in approximately symmetrical positions with interposition of said driving member so as to be put in frictional coupling with the driving member.

According to the above arrangement, the rotatably supported rotating portion is in contact with the driving member supported linearly movably in the extension/contraction direction of the electromechanical transducer, and the displacement in the extension/contraction direction of the electromechanical transducer is transduced into a rotary movement of the rotating portion. Therefore, a highly reliable rotary type driving device having a high resolution can be provided with a simple construction. Then, since the rotating portion is allowed to have a light-weight structure, the electromechanical transducer can be driven in the supersonic wave region, thereby preventing the possible occurrence of unpleasant noises during operation.

Furthermore, by constructing the rotating portion of at least two members and making the members abut against the driving member in the approximately symmetrical positions with interposition of the driving member so as to be put in frictional coupling with the driving member, no bending stress is applied to the driving member, thereby allowing the reliability of the driving device to be improved.

These and other objects, advantages and features of the invention will become apparent from the following description thereof taken in conjunction with the accompanying drawings, which illustrate specific embodiments of the invention.

BRIEF DESCRIPTION OF THE DRAWINGS

In the following description, like parts are designated by like reference numbers throughout the several drawings.

DETAILED DESCRIPTION OF THE PREFERRED EMBODIMENTS

Figure 1:
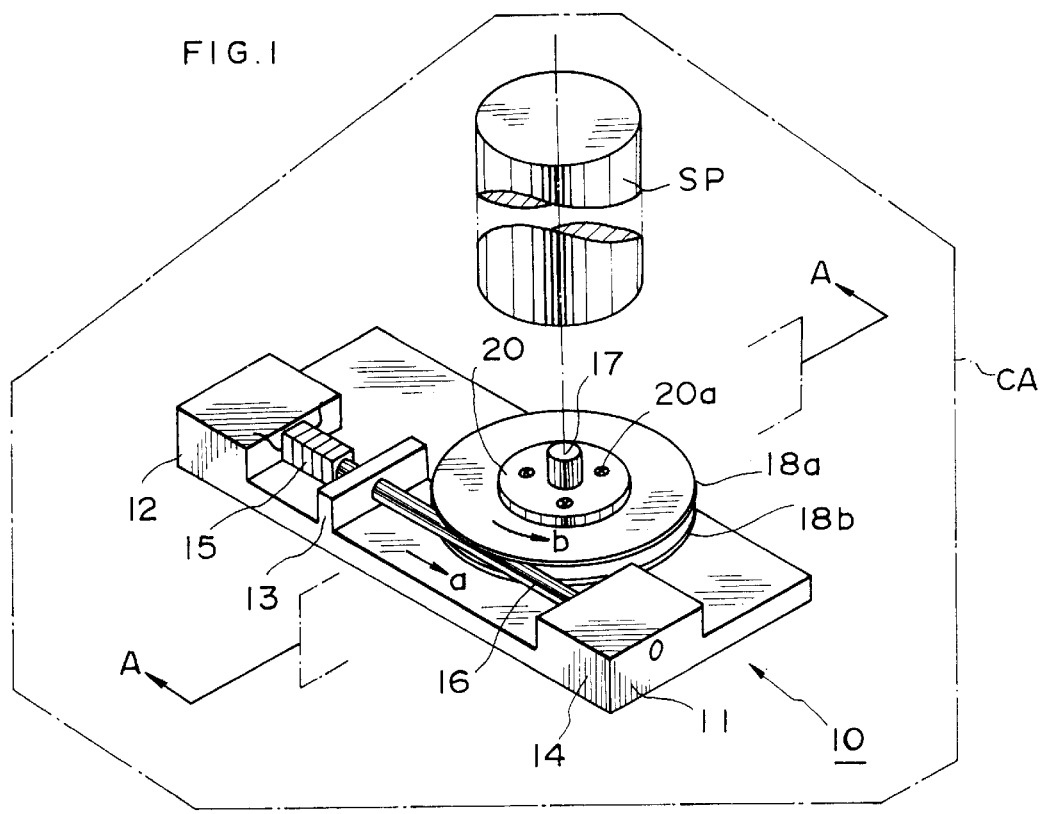
FIG. 1 is a perspective view for explaining the construction of an apparatus according to a first embodiment of the present invention.
Figure 2:
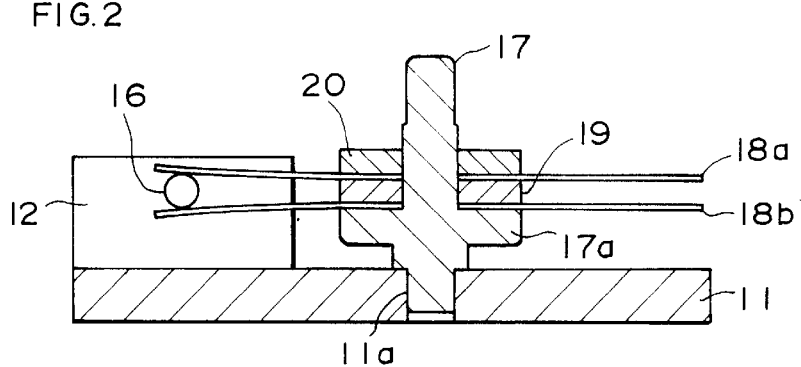
FIG. 2 is a sectional view of the rotary type driving device provided in the apparatus shown in FIG. 1.

Embodiments of the present invention will be described below. FIG. 1 is a perspective view for explaining the construction of the first embodiment of the present invention, while FIG. 2 is a sectional view taken along the plane A—A in FIG. 1. Description will be made with reference to FIGS. 1 and 2. A rotary type driving device 10 is constructed of a base 11, support blocks 12, 13 and 14 provided on the base 11, a piezoelectric element 15, a driving shaft 16, a rotary shaft 17, two disks 18a and 18b constituting a rotating portion fixed to the rotary shaft 17, and so forth. In the present embodiment, this driving device 10 is used as a drive source for driving a spool SP of a camera CA.

The driving shaft 16 is supported movably in the axial direction by the support block 13 and the support block 14. one end of the piezoelectric element 15 is fixed by bonding to the support block 12, and the other end is fixed by bonding to one end of the driving shaft 16. The driving shaft 16 is supported displaceably in the axial direction (in the direction of arrow "a" and the direction opposite to it) when a displacement is generated in the direction of thickness of the piezoelectric element 15.

The disks 18*a* and 18*b* are made of an elastic material, and they are fixed to the rotary shaft 17 with a specified gap retained between them by a spacer 19 which has a thickness smaller than the diameter of the driving shaft 16. Further, the disks 18*a* and 18*b* are constructed so that they vertically hold the driving shaft 16 between them in a position located apart outwardly from their rotation center so as to generate a frictional force required for the rotative driving of them with the driving shaft 16 by their elastic forces. It is to be noted that the reference number 17*a* denotes a lower seat integrated with the rotary shaft 17 and the reference number 20 denotes an upper seat mounted around the rotary shaft 17 above the disk 18*a*. After the disk 18*a*, the spacer 19 and the disk 18*b* are mounted around the rotary shaft 17, they are fixed to the lower seat 17*a* by means of small screws 20*a*. The rotary shaft 17 is rotatably supported by a bearing 11*a* provided at the base 11.

Figure 17:
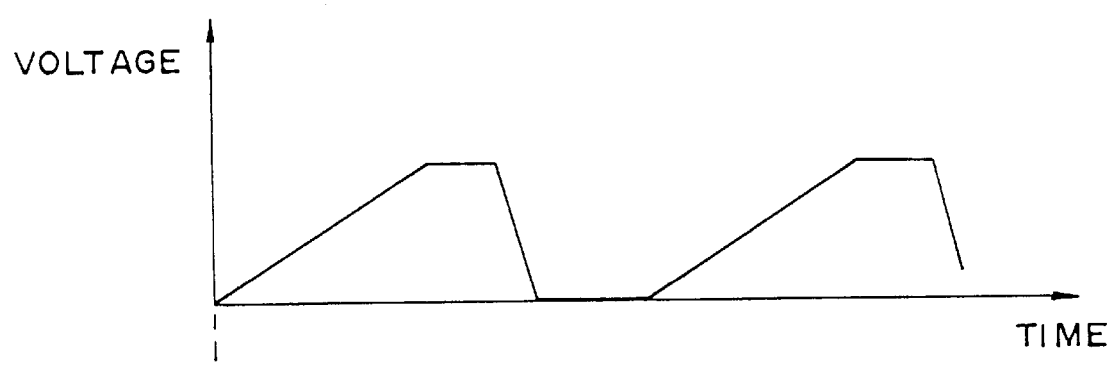
FIG. 17 is a chart showing an example of the waveform of the drive pulse applied to an electromechanical transducing element.
Figure 17:
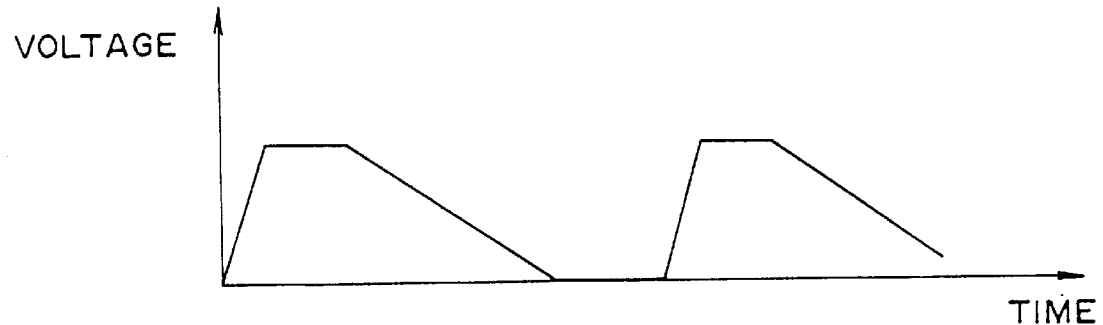

The operation will be described next. First, when a saw-tooth wave drive pulse having a gradual rising portion and a steep falling portion as shown in(a) of FIG. 17 is applied to the piezoelectric element 15, the piezoelectric element 15 is displaced as it is gradually extended in the direction of thickness in the gradual rising portion of the drive pulse, and the driving shaft 16 coupled with the piezoelectric element 15 is also gradually displaced linearly in the positive direction (in the direction of arrow "a"). As a result, the disks 18*a* and 18*b* which are frictionally coupled with the driving shaft 16 receive a force in the tangential direction (force in the direction of arrow "a") on their frictionally coupled portions, and therefore, the disks 18*a* and 18*b* rotate in the positive direction (in the counterclockwise direction "b" in FIG. 1) around the rotary shaft 17.

In the steep falling portion of the drive pulse, the piezoelectric element 15 is displaced as it is rapidly contracted in the direction of thickness, and the driving shaft 16 coupled with the piezoelectric element 15 is also rapidly displaced in the negative direction (the direction opposite to the direction of arrow "a"). In this stage, the disks 18*a* and 18*b* which are frictionally coupled with the driving shaft 16 do not rotate but substantially stay in the position as a consequence of the conquest of their inertia forces over the frictional coupling force. By continuously applying the aforementioned drive pulse to the piezoelectric element 15, the disks 18*a* and 18*b* can be continuously rotated in the positive direction (the counterclockwise direction "b" in FIG. 1).

It is to be noted that the term "substantially" mentioned herein includes the case where the disks 18*a* and 18*b* follow the movement of the driving shaft 16 in either the positive direction or the negative direction with a slip generated between their frictional coupling surfaces and the driving shaft 16 and totally rotate in the positive direction due to a difference in the driving time.

For the rotation of the disks 18*a* and 18*b* in the direction opposite to the aforementioned direction (in the clockwise direction in FIG. 1), the rotation can be achieved by changing the waveform of the saw-tooth wave drive pulse applied to the piezoelectric element 15 and applying the drive pulse having a steep rising portion and a gradual falling portion as shown in (b) of FIG. 17.

According to the above-mentioned construction, the optimum frictional coupling force can be obtained by changing the thickness of the spacer 19 or by appropriately selecting the elastic material constituting the disks 18*a* and 18*b* for the purpose of changing the spring constant thereby adjusting the frictional coupling force between the driving shaft 16 and the disks 18*a* and 18*b*.

Furthermore, by adjusting the position of the seat 17*a* of the rotary shaft 17 and the thickness of the spacer 19 so that the disks 18*a* and 18*b* are placed in symmetrical positions located vertically apart by an equal distance from the plane that passes through the center line of the driving shaft 16, not only can the elastic forces of the disks 18*a* and 18*b* be efficiently utilized for the frictional coupling force, but also no bending load is applied to the driving shaft 16, thereby improving the reliability. Furthermore, because the driving shaft 16 and the disks 18*a* and 18*b* are always put in contact with each other even when the disks are rotated, no change in the frictional coupling force occurs due to the rotation of the disks, thereby allowing a stable driving force to be consistently obtained.

Figure 3:
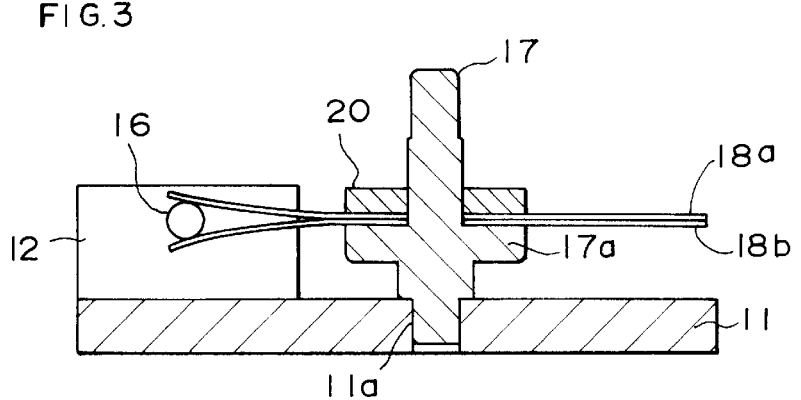
FIG. 3 is a sectional view for explaining the construction of a rotary type driving device according to a second embodiment.

A second embodiment will be described below. FIG. 3 is a sectional view for explaining the construction of the second embodiment. The present embodiment has a construction in which the spacer 19 placed between the two disks 18*a* and 18*b* in the aforementioned first embodiment are eliminated so that the disks 18*a* and 18*b* are superposed on each other. The other points are not different from those of the first embodiment, and therefore, the same components are denoted by the same reference symbols with no detailed description provided for them. According to this construction, the components constituting the rotary type driving device can be reduced in number.

Figure 4:
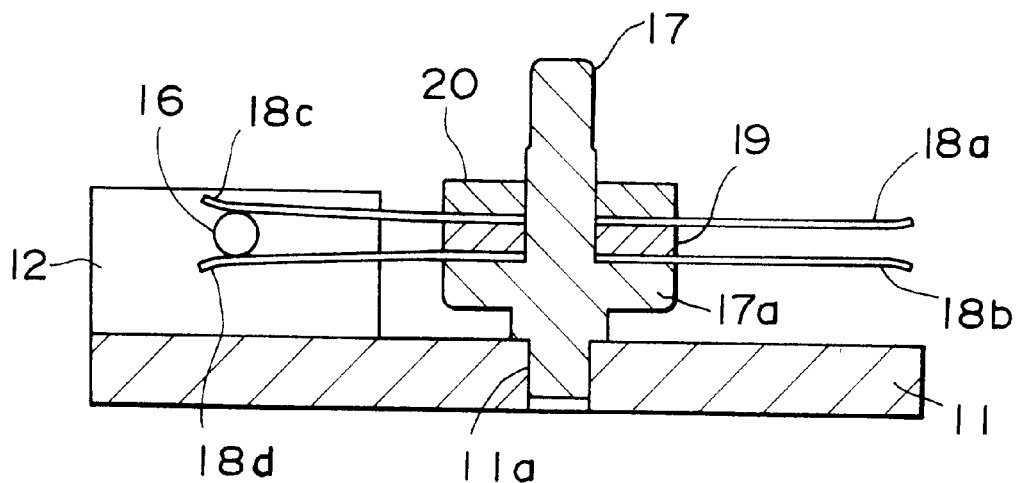
FIG. 4 is a sectional view for explaining the construction of a rotary type driving device according to a third embodiment.

A third embodiment will be described. FIG. 4 is a sectional view showing the construction of the third embodiment. Peripheral portions 18*c* and 18*d* of the two disks 18*a* and 18*b* in the aforementioned first embodiment are bent outward (to the opposite side of the driving shaft 16) so that the peripheral portions do not come in contact with the driving shaft 16, namely, the peripheral portion 18*c* of the upper disk 18*a* is bent upward and the peripheral portion 18*d* of the lower disk 18*b* is bent downward). The other portions are not different from those of the aforementioned first embodiment, and therefore, the same components are denoted by the same reference symbols with no detailed description provided for them. According to this construction, the peripheral portions of the disks 18*a* and 18*b* have no chance to come in contact with the driving shaft 16, and therefore, even a soft material such that it will be abraded away when in contact with the peripheral portions of the disks 18*a* and 18*b* can be used as the material of the driving shaft 16.

Figure 5:
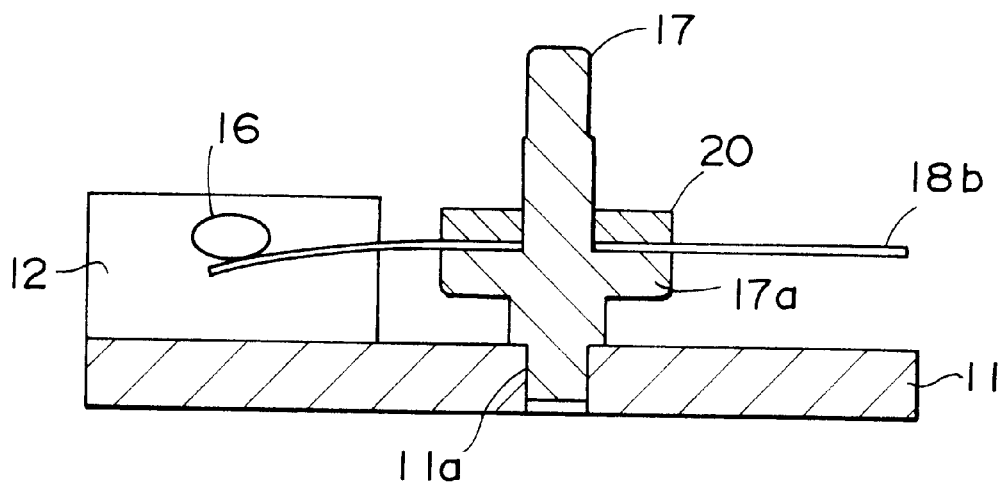
FIG. 5 is a sectional view for explaining the construction of a rotary type driving device according to a fourth embodiment.

A fourth embodiment will be described. FIG. 5 is a sectional view showing the construction of the fourth embodiment, where the driving shaft 16 in the aforementioned first embodiment has an oval section shape and one disk (only the disk 18*b* frictionally coupled with the driving shaft 16 from the lower side) is frictionally coupled with the driving shaft 16. The other portions are not different from those of the aforementioned first embodiment, and therefore, the same components are denoted by the same reference symbols with no detailed description provided for them. According to this construction, since the section shape of the driving shaft 16 is oval, the contact area of the driving shaft 16 with the disk 18*b* is increased, so that the frictional force is stabilized thereby improving the driving characteristic. It is to be noted that two disks (disks 18*a* and 18*b*) may be provided so that they hold the driving shaft 16 between them similar to the first embodiment.

Figure 6:
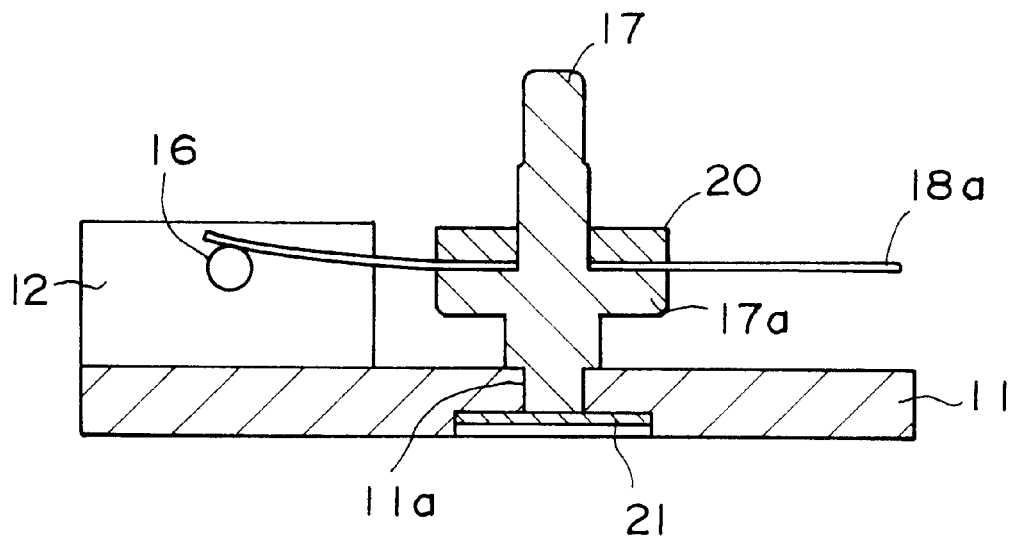
FIG. 6 is a sectional view for explaining the construction of a rotary type driving device according to a fifth embodiment.

A fifth embodiment will be described. FIG. 6 is a sectional view showing the construction of the fifth embodiment, where one disk (only the disk 18a frictionally coupled with the driving shaft 16 from the upper side) is frictionally coupled with the driving shaft 16 in the first embodiment. According to this construction, an upward force is applied to the rotary shaft 17 due to the elastic force of the disk 18a, and therefore, a thrust disk 21 is fixed to the end portion of the rotary shaft 17 so that the rotary shaft 17 comes out of the bearing 11a. The other portions are not different from those of the aforementioned first embodiment, and therefore, the same components are denoted by the same reference symbols with no detailed description provided for them. According to this construction, a fewer number of components is employed, so that the assembling can be performed easily.

Figure 7:
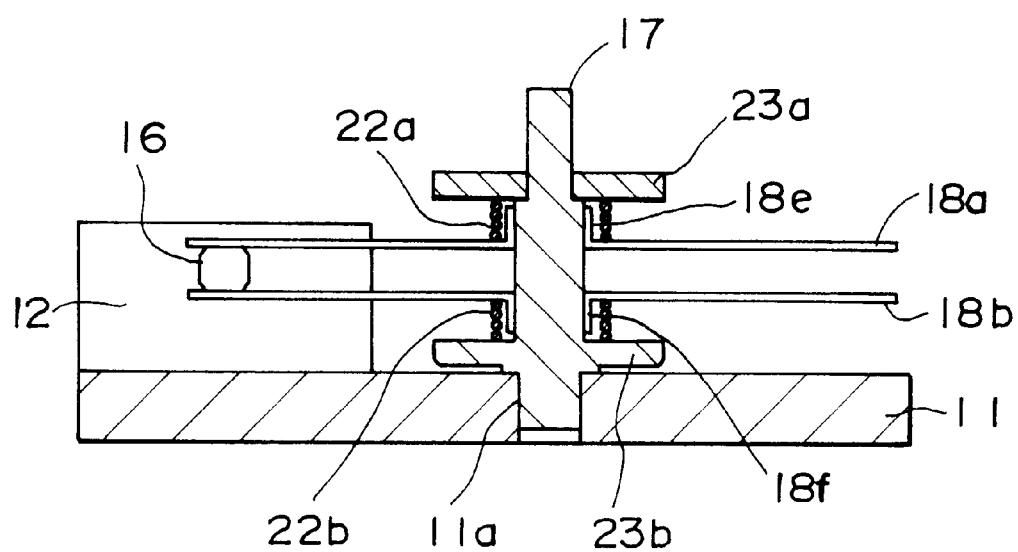
FIG. 7 is a sectional view for explaining the construction of a rotary type driving device according to a sixth embodiment.

A sixth embodiment will be described. FIG. 7 is a sectional view showing the construction of the sixth embodiment, where the disks 18a and 18b have their center portions provided with flanges 18e and 18f fitted on the rotary shaft 17, and they are supported by an appropriate member such as a key provided between the flanges and the rotary shaft so that they move slidably in the axial direction of the rotary shaft 17 and rotate together with the rotary shaft around the rotary shaft 17. Further, an upper seat 23a is fitted and fixed on the upper side of the rotary shaft 17, and a lower seat 23b is integrated with the rotary shaft 17 on the lower side of the shaft.

A spring 22a is provided between the upper disk 18a and the upper seat 23a, and a spring 22b is provided between the lower disk 18b and the lower seat 23b, so that the upper disk 18a and the lower disk 18b slide in the axial direction of the rotary shaft 17 as urged in a direction in which they come close to each other. The upper disk 18a and the lower disk 18b vertically hold the driving shaft 16 between them in a position located apart outwardly from their rotation center so as to generate a frictional force required for the rotative drive of them between the disks and the driving shaft 16 by the urging forces of the spring 22a and the spring 22b.

The point that the upper disk 18a and the lower disk 18b rotatively move as a consequence of the application of a driving force in the tangential direction to the upper disk 18a and the lower disk 18b which are frictionally coupled with the driving shaft 16 due to reciprocal movements at different speeds generated at the driving shaft 16 is not different from those of the first through fifth embodiments.

By setting the positions of the upper seat 23a and the lower seat 23b of the rotary shaft 17 so that the disks 18a and 18b are placed in symmetrical positions located vertically apart by an equal distance from the plane that passes through the center line of the driving shaft 16, not only can the elastic forces of the springs 22a and 22b be efficiently utilized for the frictional coupling force, but also no bending load is applied to the driving shaft 16, thereby improving the reliability. Furthermore, because the driving shaft 16 and the disks 18a and 18b are always put in contact with each other even when the disks are rotated, no change in the frictional coupling force occurs due to the rotation of the disks, thereby allowing a stable driving force to be consistently obtained.

Further, by making the driving shaft 16 have an approximately square section shape (the four corners are chamfered in the present embodiment) and putting the shaft in surface contact with the upper disk 18a and the lower disk 18b, the frictional contact surface is increased and the frictional coupling force is stabilized, thereby allowing the drive characteristic to be improved.

Figure 8:
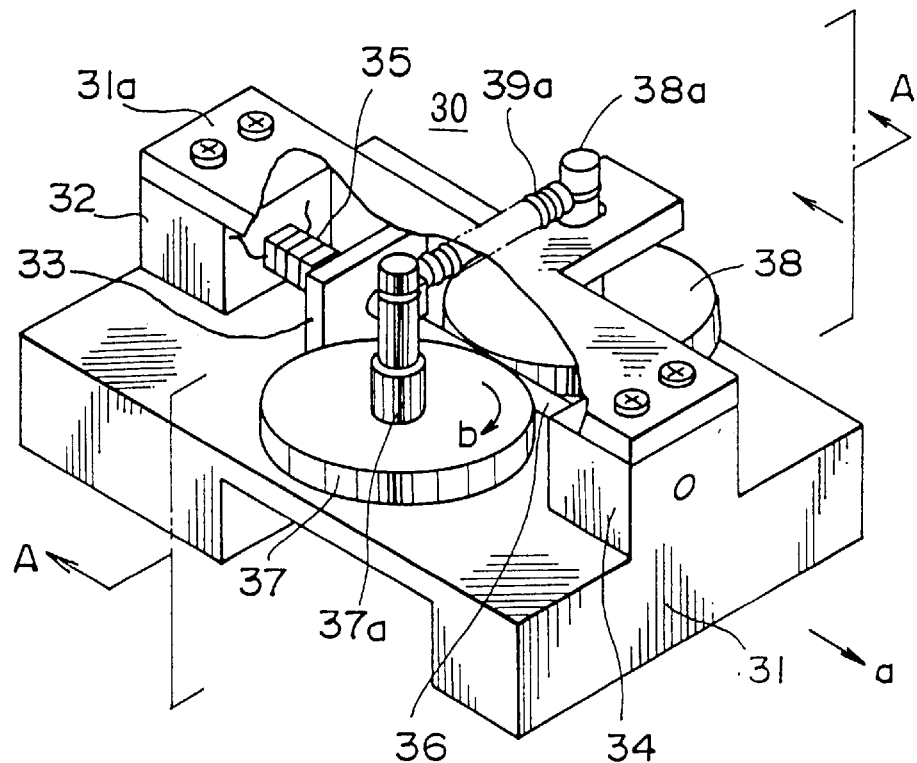
FIG. 8 is a perspective view for explaining the construction of a rotary type driving device according to a seventh embodiment.
Figure 9:
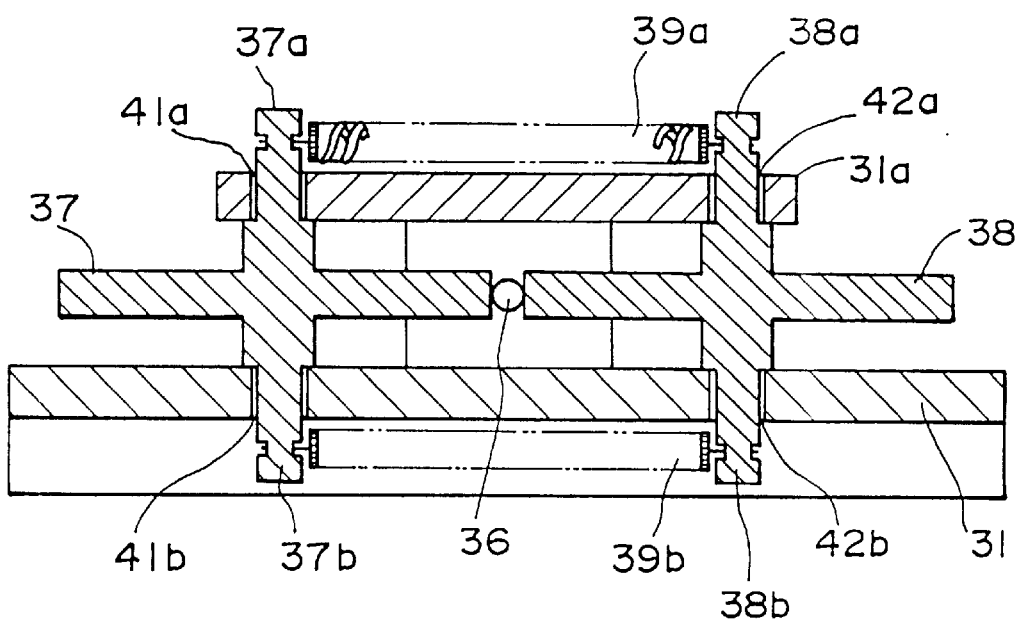
FIG. 9 is a sectional view of the rotary type driving device shown in FIG. 8.

A seventh embodiment will be described. FIG. 8 is a perspective view showing the construction of the seventh embodiment with a part removed, while FIG. 9 is a sectional view taken along the plane A—A in FIG. 8. This embodiment will be described below with reference to FIGS. 8 and 9. The rotary type driving device 30 is constructed of a base 31, support blocks 32, 33 and 34 provided on the base 31, a support block 31a extending over the support blocks 32 and 34, a piezoelectric element 35, a driving shaft 36, a first disk 37 provided with rotary shafts 37a and 37b located at the upper and lower sides, a second disk 38 provided with rotary shafts 38a and 38b located at the upper and lower sides, a spring 39a extending between the rotary shaft 37a and the rotary shaft 38a and a spring 39b extending between the rotary shaft 37b and the rotary shaft 38b.

The driving shaft 36 is supported movably in the axial direction by the support block 33 and the support block 34. One end of the piezoelectric element 35 is fixed by bonding to the support block 32, and the other end is fixed by bonding to one end of the driving shaft 36. The driving shaft 36 is supported displaceably in the axial direction (in the direction of arrow "a" and the direction opposite to it) when a displacement is generated in the direction of thickness of the piezoelectric element 35. This portion has the same construction as that of the first embodiment.

Peripheral portions of the first disk 37 and the second disk 38 have a thickness approximately equal to the diameter of the driving shaft 36 and are arranged so that the portions are put in frictional contact with the driving shaft 36 placed between the first disk 37 and the second disk 38. The rotary shafts 37a and 37b of the first disk 37 and the rotary shafts 38a and 38b of the second disk 38 are supported as loosely fitted in a hole 41a provided through the support block 31a, a hole 41b provided in the base 31, a hole 42a provided through the support block 31a and a hole 42b provided in the base 31, respectively.

The spring 39a is extending between the rotary shaft 37a and the rotary shaft 38a, and the spring 39b is extending between the rotary shaft 37b and the rotary shaft 38b, so that the peripheral portion of the first disk 37 and the peripheral portion of the second disk 38 are frictionally coupled with the driving shaft 36 by an appropriate pressure force.

Similar to the aforementioned first embodiment, by applying a saw-tooth wave drive pulse to the piezoelectric element 35 for the generation of reciprocal movements at different speeds at the driving shaft 36, a driving force in the tangential direction is applied to the first disk 37 and the second disk 38 which are frictionally coupled with the driving shaft 36, thereby allowing a rotative movement to be generated at the first disk 37 and the second disk 38.

Since the first disk 37 and the second disk 38 are placed in symmetrical positions located apart from the center line of the driving shaft 36, not only can the elastic forces of the springs 39a and 39b be efficiently utilized for the frictional coupling force, but also no bending load is applied to the driving shaft 36, thereby improving the reliability. Furthermore, by extending the two springs 39a and 39b having an identical spring constant in the positions located apart by an equal distance from the disks 37 and 38, there is no possibility of the occurrence of disorder of the disks 37 and 38.

Although the diameters of the first disk 37 and the second disk 38 are made equal to each other in the aforementioned seventh embodiment, two different rotating speeds can be obtained by using disks having different diameters, when driving devices having different resolutions can be concurrently obtained.

Figure 10:
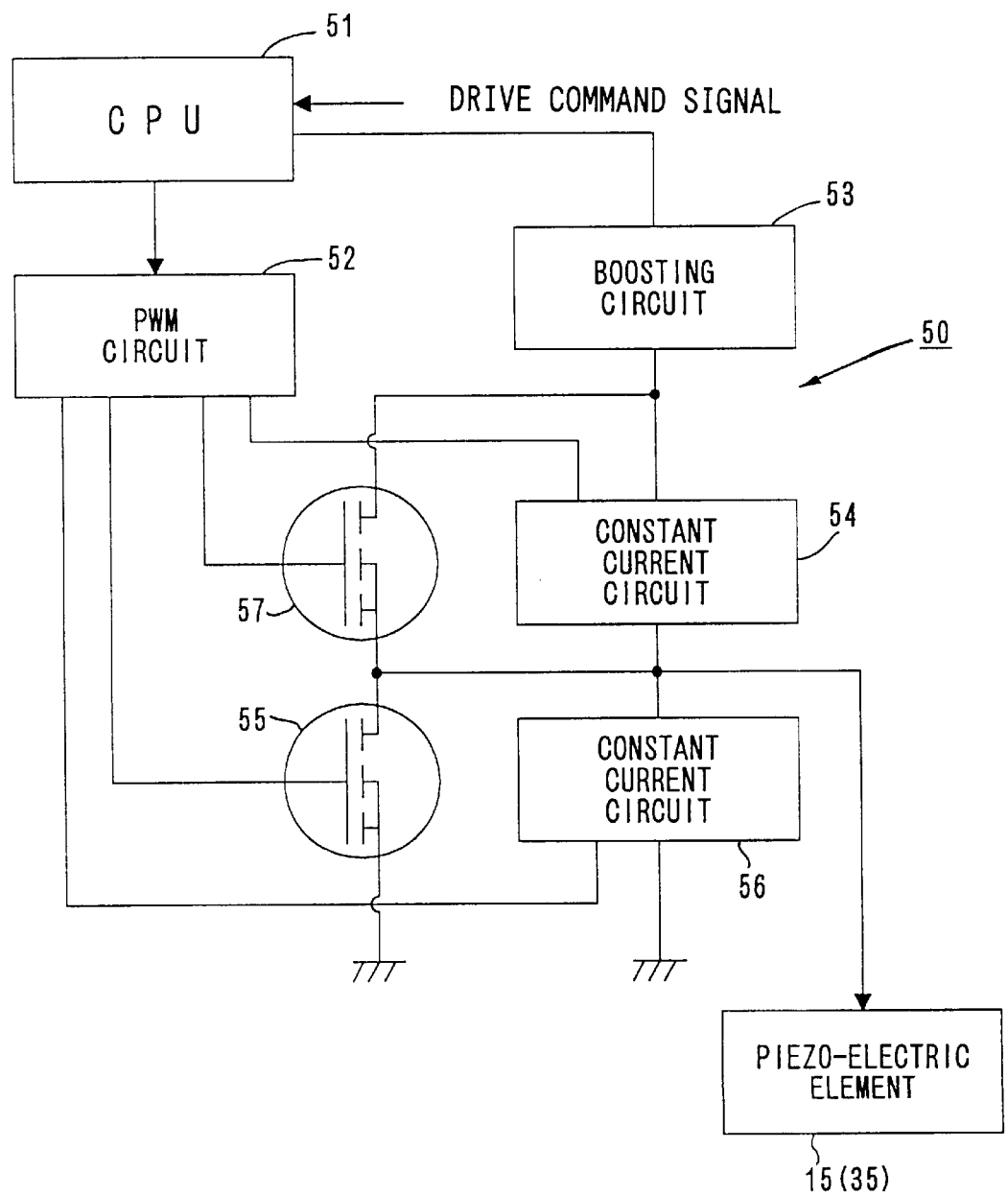
FIG. 10 is a block diagram of a drive circuit for a piezoelectric element.

A drive circuit for the piezoelectric element and its operation will be described next with reference to FIGS. 10 through 12. The reference number 51 denotes a CPU for controlling the drive circuit 50, and to its input port is input a drive command signal from a device (not shown). The CPU 51 has its output port connected to a PWM (Pulse Width Modulation) circuit 52 and a boosting circuit 53. The reference numbers 55 and 57 denote FETs (Field Effect Transistors) which are controlled to be turned on and off by a PWM signal output from the PWM (Pulse Width Modulation) circuit 52 which operates based on a duty ratio D (ON/OFF time ratio) determined by the CPU 51. The reference numbers 54 and 56 denote constant-current circuits for executing electric charging and discharging on the piezoelectric element with a specified constant current. The piezoelectric element driven by the drive circuit 50 is the piezoelectric element 15 (or 35) in the driving device described above with reference to FIGS. 1 through 9.

The control operation of the drive circuit 50 will be described with reference to the timing charts shown in FIGS. 11 and 12. First, the driving device is in its normal drive state in which gradual charging and rapid discharging are executed on the piezoelectric element 15. The control operation in the case where a drive pulse having the waveform shown in (a) of the timing chart of FIG. 11 is applied will be described.

In the normal drive state, the PWM circuit 52 and the boosting circuit 53 are in their operating states, in which the PWM circuit 52 outputs the PWM signal (ON/OFF control signal) to the constant-current circuit 54 and the FET 55 based on a specified duty ratio D appropriate for the normal drive determined by the CPU 51. In this stage, the constant-current circuit 56 and the FET 57 are controlled so as to be kept in the OFF-state (see (d) and (e) of FIG. 11).

Figure 11:
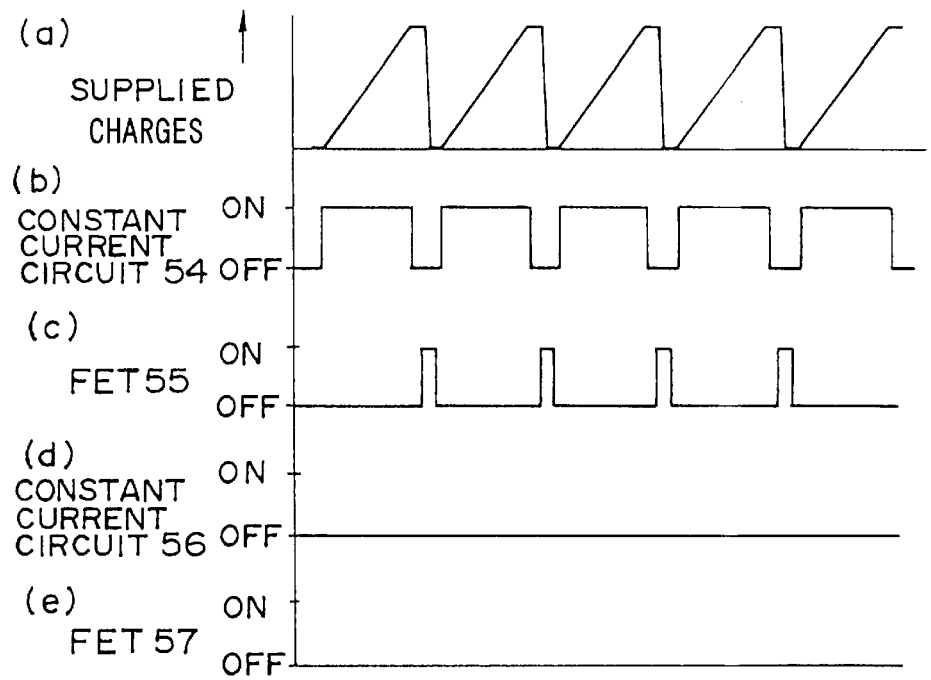
FIG. 11 is a first timing chart for explaining the operation of the drive circuit shown in FIG. 10.

The constant-current circuit 54 is turned on and off in accordance with the timing shown in part (b) of FIG. 11 by the PWM signal output from the PWM circuit 52. In the ON-state period, the piezoelectric element 15 is charged at a constant current with the output from the boosting circuit 53 via the constant-current circuit 54. Further, the FET 55 is turned on and off in accordance with the timing shown in (c) of FIG. 11 by the PWM signal outputted from the PWM circuit 52 so as to be made conductive only in the ON-state period, so that the electric charges accumulated in the piezoelectric element 15 are rapidly discharged.

As described above, the piezoelectric element 15 is gradually charged and rapidly discharged, so that the drive pulse having the waveform shown in (a) of the timing chart of FIG. 11 is applied. In the period in which the piezoelectric element 15 is gradually charged, i.e., in the portion where the drive pulse gradually rises, the piezoelectric element 15 generates a gradual extension displacement in the direction of thickness, and the driving shaft is displaced in the axial direction (direction of the arrow "a"), thereby allowing the disks 18a and 18b to be rotated.

In the period in which the piezoelectric element 15 is rapidly discharged, i.e., in the portion where the drive pulse rapidly falls, the piezoelectric element 15 generates a rapid contraction displacement in the direction of thickness, and the driving shaft is displaced in the direction opposite to the direction of arrow "a."

Figure 12:
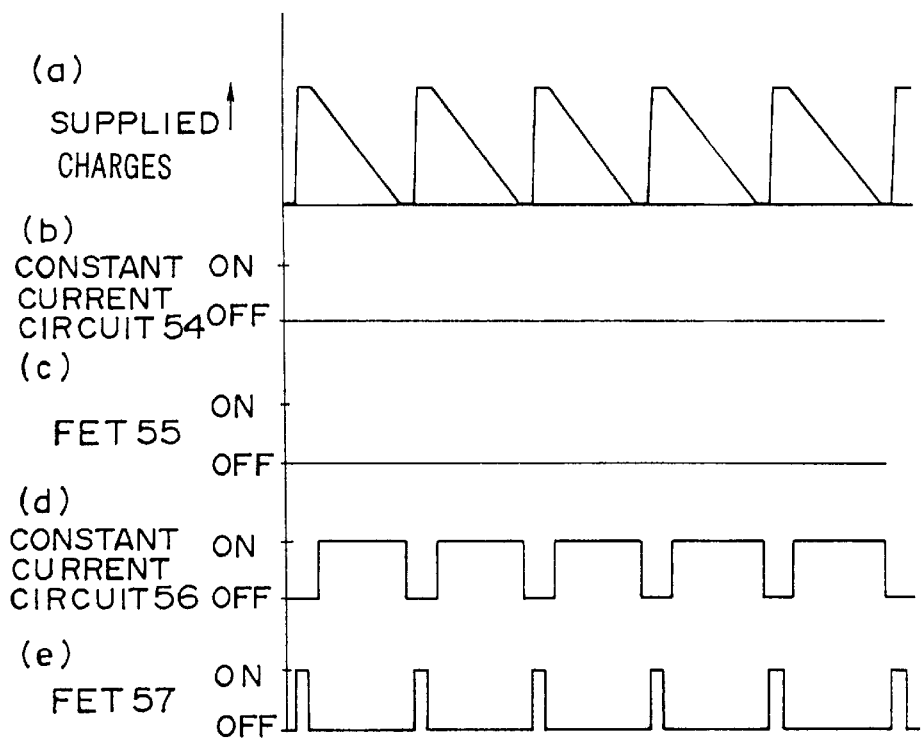
FIG. 12 is a second timing chart for explaining the operation of the drive circuit shown in FIG. 10.
Figure 13:
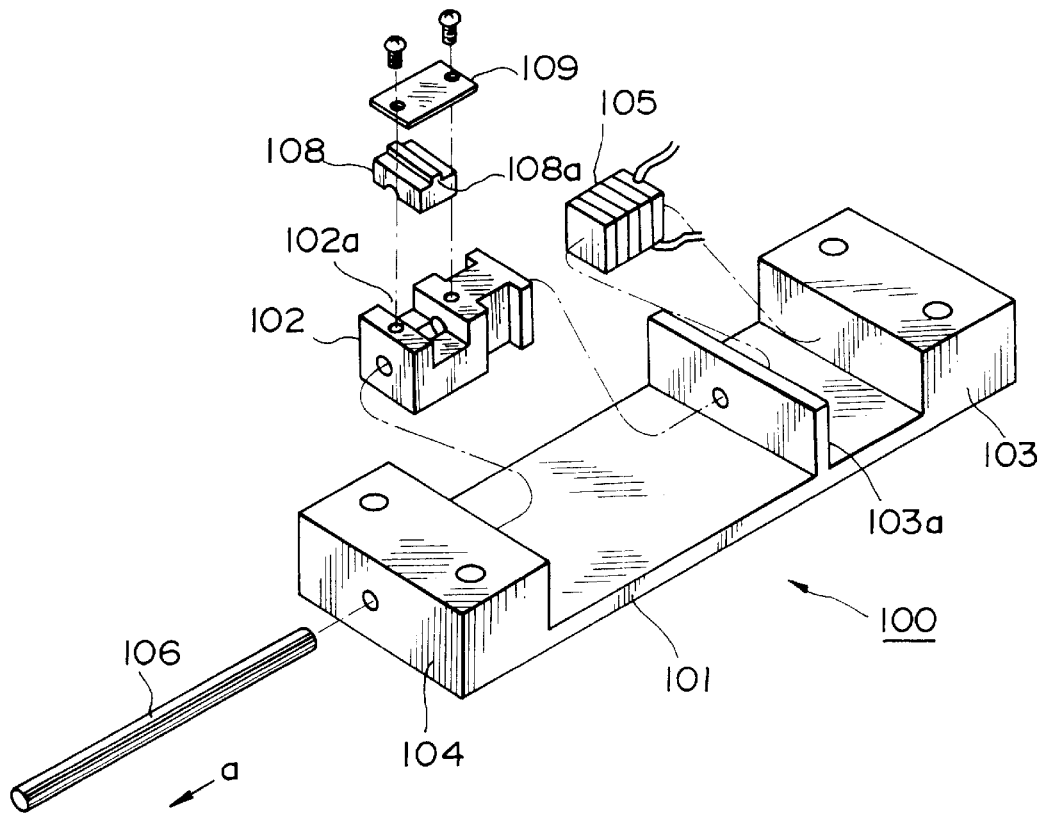
FIG. 13 is an exploded perspective view for explaining the construction of a prior art linearly advancing type driving device.
Figure 14:
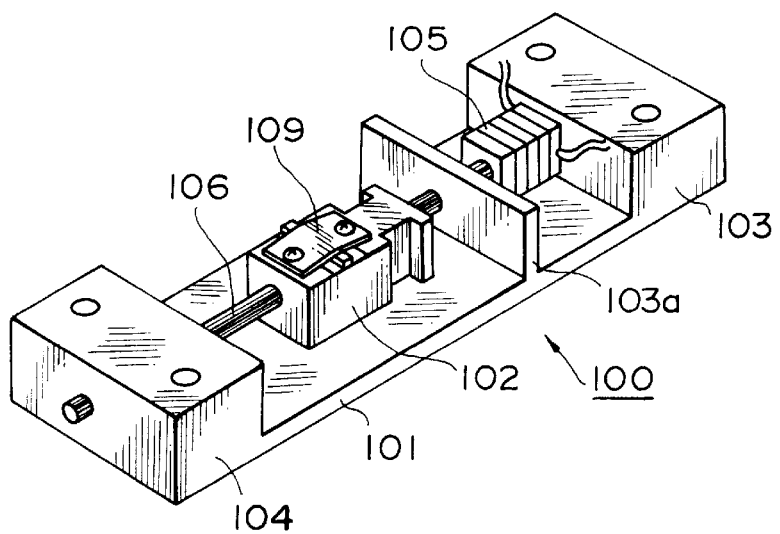
FIG. 14 is a perspective view showing a state in which the linearly advancing type driving device shown in FIG. 13 is assembled.
Figure 15:
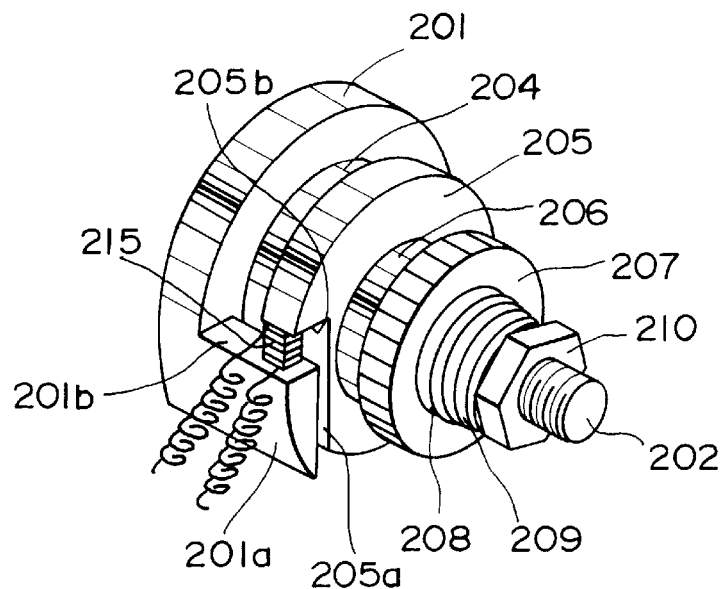
FIG. 15 is a perspective view for explaining the construction of a prior art rotary type driving device.
Figure 16:
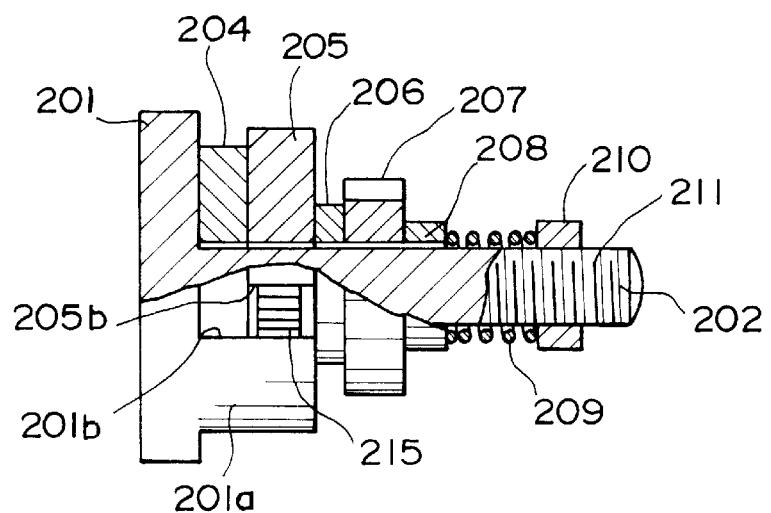
FIG. 16 is a sectional view for explaining the construction of the rotary type driving device shown in FIG. 15.

A control operation in the case where a drive pulse having the waveform shown in (a) of the timing chart of FIG. 12 is applied for executing rapid charging and gradual discharging on the piezoelectric element 15 will be described next.

The PWM circuit 52 and the boosting circuit 53 are in their operating states, in which the PWM circuit 52 outputs the PWM signal (ON/OFF control signal) to the constant-current circuit 56 and the FET 57 based on the specified duty ratio D appropriate for the normal drive determined by the CPU 51. In this stage, the constant-current circuit 54 and the FET 55 are controlled so as to be kept in the OFF-state (see (b) and (c) of FIG. 12).

The FET 57 is turned on and off in accordance with the timing shown in (e) of FIG. 12 by the PWM signal outputted from the PWM circuit 52, and it is put into its conductive state during the ON—state period. Consequently, the piezoelectric element 15 is rapidly charged with the output from the boosting circuit 53 via the FET 57. Further, the constant-current circuit 56 is turned on and off in accordance with the timing shown in (d) of FIG. 12 by the PWM signal outputted from the PWM circuit 52, so that the electric charges accumulated in the piezoelectric element 15 are gradually discharged at a constant current via the constant-current circuit 56 during the On-state period.

Since the piezoelectric element 15 is rapidly charged and gradually discharged, and therefore, the driving shaft rapidly extends in the direction of arrow "a" and then gradually contracts.

The ON/OFF timing of the constant-current circuits 54 and 56 and the FETs 55 and 57 includes a period in which both the constant-current circuits and the FETs are turned off. This arrangement is adopted for the reason that, if there is no such period in which both the constant-current circuits and the FETs are turned off, the output side of the booster circuit is disadvantageously grounded when both the constant-current circuits and the FETs are concurrently turned on due to a lag of response of the operating elements, and this will result in the damage of the circuits and abnormal increase of the consumption power.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An apparatus comprising:
   a base;
   an electro-mechanical transducer one end of which is fixed to said base, said transducer is capable of extending and contracting alternatingly;
   a moving device one end of which is fixed to another end of said transducer, said moving device is movable in a direction of extension-contraction direction of said transducer;
   a rotary portion which is in contact with said moving device and rotated in one direction by the contact when said moving device is moved by the alternating extending and contracting of said electro-mechanical transducer.

2. An apparatus as claimed in claim 1, wherein said rotary portion includes a disk.

3. An apparatus as claimed in claim 2, wherein said disk is made of an elastic material.

4. An apparatus as claimed in claim 1, wherein said rotary portion includes a pair of rotary members which frictionally hold said moving device therebetween.

5. An apparatus as claimed in claim 4, wherein one of said rotary members is a disk.

6. An apparatus as claimed in claim 5, wherein said disk is made of a elastic material.

7. An apparatus as claimed in claim 4 further comprising an urging member which urges said rotary members toward said moving device to hold it therebetween.

8. An apparatus as claimed in claim 4, wherein said moving device is held between an upper surface of one of said rotary members and a lower surface of another of said rotary members.

9. An apparatus as claimed in claim 4, wherein said moving device is held between peripheral edges of said rotary members.

10. A driving device comprising:

a base;

an electro-mechanical transducer one end of which is fixed to said base, said transducer is capable of extending and contracting alternatingly;

a moving device one end of which is fixed to another end of said transducer, said moving device is movable in a direction of extension-contraction direction of said transducer;

a rotary portion which is in contact with said moving device and rotated in one direction by the contact when said moving device is moved by the alternating extending and contracting of the electromechanical transducer.

11. A driving device as claimed in claim 10, wherein said rotary portion includes a disk.

12. A driving device as claimed in claim 11, wherein said disk is made of an elastic material.

13. A driving device as claimed in claim 10, wherein said rotary portion includes a pair of rotary members which frictionally hold said moving device therebetween.

14. A driving device as claimed in claim 13, wherein one of said rotary members is a disk.

15. A driving device as claimed in claim 14, wherein said disk is made of a elastic material.

16. A driving device as claimed in claim 13 further comprising an urging member which urges said rotary members toward said moving device to hold it therebetween.

17. A driving device as claimed in claim 13, wherein said moving device is held between an upper surface of one of said rotary members and a lower surface of another of said rotary members.

18. A driving device as claimed in claim 13, wherein said moving device is held between peripheral edges of said rotary members.

19. An apparatus as claimed in claim 4, wherein said rotary members are mutually spaced by a specified gap which is smaller than a diameter of said moving device.

20. An apparatus as claimed in claim 19, further comprising a spacer provided between said pair of rotary members so as to maintain the specified gap.

21. A driving device as claimed in claim 13, wherein said rotary members are mutually spaced by a specified gap which is smaller than a diameter of said moving device.

22. A driving device as claimed in claim 21, further comprising a spacer provided between said pair of rotary members so as to maintain the specified gap.

23. An apparatus as claimed in claim 1, wherein the rotary portion includes means for enabling the rotary portion to slip with regard to the moving device during one of the extending and contracting and to engage with the moving device during the other of extending end contracting.

24. A driving device as claimed in claim 10, wherein the rotary portion includes means for enabling the rotary portion to slip with regard to the moving device during one of the extending and contracting and to engage with the moving device during the other of extending and contracting.

25. An apparatus as claimed in claim 1, wherein said rotary portion is rotated in an opposite direction by changing the manner of extension and contraction of said electromechanical transducer.

26. An apparatus as claimed in claim 25 further comprising an electrical circuit which supplies pulse signals to said electro-mechanical transducer so as to alternatingly extend and contract said electromechanical transducer.

27. An apparatus as claimed in claim 26, wherein said direction of rotation of said rotary portion is determined by a waveform of said pulse signal.

28. A driving device as claimed in claim 10, wherein said rotary portion is rotated in an opposite direction by changing the manner of extension and contraction of said electromechanical transducer.

29. A driving device as claimed in claim 28 further comprising an electrical circuit which supplies pulse signals to said electromechanical transducer so as to alternately extend and contract said electromechanical transducer.

30. A driving device as claimed in claim 29, wherein said direction of rotation of said rotary portion is determined by the waveform of said pulse signal.

31. A camera, comprising:

a base;

an electromechanical transducer, one end of which is fixed to said base, said transducer is capable of extending and contracting alternatingly;

a moving device, one end of which is fixed to another end of said transducer, said moving device is movable in a direction of extension-contraction direction of said transducer; and a rotary portion which is in contact with said moving device and rotated in one direction by the contact when said moving device is moved by the alternating extending and contracting of said electro-mechanical transducer.

32. The camera of claim 31, further comprising a spool that is connected to the rotary portion and which is driven by the rotary portion.

* * * * *